United States Patent
Grigg et al.

(10) Patent No.: US 9,391,977 B2
(45) Date of Patent: *Jul. 12, 2016

(54) PROVIDING AUTHENTICATION USING PREVIOUSLY-VALIDATED AUTHENTICATION CREDENTIALS

(71) Applicant: Bank of America Corporation, Charlotte, NC (US)

(72) Inventors: David M. Grigg, Rock Hill, SC (US); Peter John Bertanzetti, Charlotte, NC (US); Hood Qaim-Maqami, Montclair, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,562

(22) Filed: Feb. 18, 2016

(65) Prior Publication Data
US 2016/0173477 A1    Jun. 16, 2016

Related U.S. Application Data

(63) Continuation of application No. 14/175,146, filed on Feb. 7, 2014, now Pat. No. 9,317,673.

(51) Int. Cl.
*G06F 7/04* (2006.01)
*G06F 15/16* (2006.01)
(Continued)

(52) U.S. Cl.
CPC .............. *H04L 63/08* (2013.01); *H04L 63/126* (2013.01)

(58) Field of Classification Search
CPC ..................................................... G06F 21/31
USPC ........................................................... 726/7
See application file for complete search history.

(56) References Cited

U.S. PATENT DOCUMENTS 5,437,346 A    8/1995 Dumont
6,256,670 B1 *  7/2001 Davies ................ H04L 43/0805
                                                                  709/224

(Continued)

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

(Continued)

*Primary Examiner* — Morshed Mehedi
*Assistant Examiner* — Khalil Naghdali
(74) *Attorney, Agent, or Firm* — Michael A. Springs; Moore and Van Allen PLLC; W. Kevin Ransom (57) ABSTRACT

Embodiments of the invention are directed to systems, methods and computer program products for providing authentication using previously-validated authentication credentials. An exemplary apparatus is configured to receive a request to access a framework application, request, from a user, one or more authentication credentials corresponding to a primary level of user authentication, receive and validate the one or more authentication credentials, create, using the framework application, an authentication token based at least partially on the validation of the primary level of user authentication, wherein the authentication token is accessible by a plurality of applications, receive a request, from the user, to access one or more non-framework applications; and authenticate the one or more non-framework applications, where authenticating the non-framework applications requires accessing the authentication token created by the framework application such that the authentication is at least partially based on the primary level of user authentication.

13 Claims, 6 Drawing Sheets

(51) Int. Cl.
*G06F 17/30* (2006.01)
*H04L 29/06* (2006.01)

(56) References Cited

U.S. PATENT DOCUMENTS

| | | | |
|---|---|---|---|
| 7,111,323 B1* | 9/2006 | Bhatia | H04L 63/0815 |
| | | | 707/999.009 |
| 7,231,202 B2 | 6/2007 | Natsuno | |
| 7,239,226 B2 | 7/2007 | Berardi et al. | |
| 7,373,515 B2 | 5/2008 | Owen et al. | |
| 7,472,081 B1 | 12/2008 | Cason | |
| 7,529,741 B2 | 5/2009 | Aravamudan et al. | |
| 7,546,276 B2 | 6/2009 | Randle et al. | |
| 7,697,920 B1 | 4/2010 | McClain | |
| 7,783,281 B1 | 8/2010 | Cook et al. | |
| 7,930,264 B2 | 4/2011 | Geppert | |
| 7,988,045 B2 | 8/2011 | Connell, II et al. | |
| 8,012,219 B2 | 9/2011 | Mendez et al. | |
| 8,156,335 B2 | 4/2012 | Lin | |
| 8,165,945 B2 | 4/2012 | Collins et al. | |
| 8,201,232 B2 | 6/2012 | Zhang et al. | |
| 8,214,650 B2 | 7/2012 | Dickinson et al. | |
| 8,244,210 B2 | 8/2012 | Ayanamcottil et al. | |
| 8,261,093 B1 | 9/2012 | Dhesi et al. | |
| 8,270,995 B1 | 9/2012 | Manroa et al. | |
| 8,286,227 B1 | 10/2012 | Zheng | |
| 8,295,812 B1 | 10/2012 | Jones | |
| 8,295,898 B2 | 10/2012 | Ashfield et al. | |
| 8,307,412 B2 | 11/2012 | Ozzie et al. | |
| 8,332,272 B2 | 12/2012 | Fisher | |
| 8,352,323 B2 | 1/2013 | Fisher | |
| 8,352,730 B2 | 1/2013 | Giobbi | |
| 8,369,833 B2 | 2/2013 | McClain | |
| 8,380,177 B2 | 2/2013 | Laracey | |
| 8,412,626 B2 | 4/2013 | Hirson et al. | |
| 8,423,466 B2 | 4/2013 | Lanc | |
| 8,442,915 B2 | 5/2013 | Takatori et al. | |
| 8,483,663 B1 | 7/2013 | Jones | |
| 8,485,438 B2 | 7/2013 | Dollard | |
| 8,601,602 B1 | 12/2013 | Zheng | |
| 8,644,506 B2 | 2/2014 | Zellner | |
| 8,660,358 B1 | 2/2014 | Bergboer et al. | |
| 8,683,571 B2* | 3/2014 | Zapata | G06F 21/43 |
| | | | 380/255 |
| 8,744,968 B1 | 6/2014 | Grigg et al. | |
| 8,768,838 B1 | 7/2014 | Hoffman | |
| 8,769,270 B2 | 7/2014 | Orsini et al. | |
| 8,869,241 B2 | 10/2014 | Davis et al. | |
| 8,869,305 B1 | 10/2014 | Huang | |
| 8,881,306 B2 | 11/2014 | Feldman et al. | |
| 8,930,271 B1 | 1/2015 | Ellis et al. | |
| 8,973,102 B2* | 3/2015 | Jakobsson | G06F 21/33 |
| | | | 713/155 |
| 2002/0077978 A1 | 6/2002 | O'Leary et al. | |
| 2002/0157029 A1 | 10/2002 | French et al. | |
| 2002/0174073 A1 | 11/2002 | Nordman et al. | |
| 2003/0065805 A1 | 4/2003 | Barnes, Jr. | |
| 2006/0030333 A1 | 2/2006 | Ward et al. | |
| 2007/0094152 A1 | 4/2007 | Bauman et al. | |
| 2007/0100773 A1 | 5/2007 | Wallach | |
| 2007/0156842 A1 | 7/2007 | Vermeulen et al. | |
| 2007/0168677 A1 | 7/2007 | Kudo et al. | |
| 2007/0219984 A1* | 9/2007 | Aravamudan | G06F 17/30035 |
| 2007/0250920 A1 | 10/2007 | Lindsay | |
| 2008/0293397 A1 | 11/2008 | Gajdos et al. | |
| 2009/0019534 A1 | 1/2009 | Bakshi et al. | |
| 2009/0100529 A1 | 4/2009 | Livnat et al. | |
| 2009/0150286 A1 | 6/2009 | Barton | |
| 2009/0187492 A1 | 7/2009 | Hammad et al. | |
| 2009/0199264 A1 | 8/2009 | Lang | |
| 2009/0217346 A1 | 8/2009 | Manring et al. | |
| 2009/0254975 A1 | 10/2009 | Turnbull et al. | |
| 2010/0100897 A1 | 4/2010 | Manuel-Devadoss | |
| 2010/0122333 A1* | 5/2010 | Noe | H04L 63/0815 |
| | | | 726/8 |
| 2010/0330958 A1 | 12/2010 | Corda et al. | |
| 2011/0016534 A1 | 1/2011 | Jakobsson et al. | |
| 2011/0137804 A1 | 6/2011 | Peterson | |
| 2011/0142234 A1 | 6/2011 | Rogers | |
| 2011/0159846 A1 | 6/2011 | Kemshall | |
| 2011/0167440 A1 | 7/2011 | Greenfield | |
| 2011/0208601 A1 | 8/2011 | Ferguson et al. | |
| 2011/0270618 A1 | 11/2011 | Banerjee et al. | |
| 2011/0320296 A1 | 12/2011 | Edwards | |
| 2012/0054057 A1 | 3/2012 | O'Connell et al. | |
| 2012/0089514 A1 | 4/2012 | Kraemling et al. | |
| 2012/0095916 A1 | 4/2012 | Dorsey et al. | |
| 2012/0137340 A1 | 5/2012 | Jakobsson et al. | |
| 2012/0144468 A1 | 6/2012 | Pratt et al. | |
| 2012/0160912 A1 | 6/2012 | Laracey | |
| 2012/0173551 A1 | 7/2012 | Haddorp et al. | |
| 2012/0174237 A1 | 7/2012 | Krzyzanowski | |
| 2012/0197743 A1 | 8/2012 | Grigg et al. | |
| 2012/0230539 A1 | 9/2012 | Calman et al. | |
| 2012/0239576 A1 | 9/2012 | Rose et al. | |
| 2012/0254941 A1 | 10/2012 | Levien et al. | |
| 2012/0254943 A1 | 10/2012 | Li | |
| 2012/0265585 A1 | 10/2012 | Muirbrook et al. | |
| 2012/0300938 A1 | 11/2012 | Kean et al. | |
| 2012/0316963 A1 | 12/2012 | Moshfeghi | |
| 2013/0007874 A1 | 1/2013 | Purvis | |
| 2013/0013498 A1 | 1/2013 | Fisher et al. | |
| 2013/0030882 A1 | 1/2013 | Davis, III et al. | |
| 2013/0030931 A1 | 1/2013 | Moshfeghi | |
| 2013/0031003 A1 | 1/2013 | Dorsey et al. | |
| 2013/0031004 A1 | 1/2013 | Dorsey et al. | |
| 2013/0042314 A1 | 2/2013 | Kelley | |
| 2013/0097682 A1 | 4/2013 | Zeljkovic et al. | |
| 2013/0097683 A1 | 4/2013 | Davis et al. | |
| 2013/0097684 A1 | 4/2013 | Kim | |
| 2013/0102283 A1 | 4/2013 | Lau et al. | |
| 2013/0111208 A1 | 5/2013 | Sabin et al. | |
| 2013/0143621 A1 | 6/2013 | Kumaran | |
| 2013/0167207 A1 | 6/2013 | Davis et al. | |
| 2013/0173456 A1 | 7/2013 | Grigg et al. | |
| 2013/0178233 A1 | 7/2013 | McCoy et al. | |
| 2013/0179954 A1* | 7/2013 | Bidare | H04L 63/18 |
| | | | 726/7 |
| 2013/0188485 A1 | 7/2013 | Midani et al. | |
| 2013/0198056 A1 | 8/2013 | Aldrey et al. | |
| 2013/0219454 A1 | 8/2013 | Hewinson | |
| 2013/0267204 A1 | 10/2013 | Schultz et al. | |
| 2013/0290361 A1 | 10/2013 | Anderson et al. | |
| 2014/0130127 A1 | 5/2014 | Toole et al. | |
| 2014/0173704 A1 | 6/2014 | Adams et al. | |
| 2014/0208401 A1* | 7/2014 | Balakrishnan | H04L 63/08 |
| | | | 726/5 |
| 2014/0279270 A1 | 9/2014 | Bertanzetti et al. | |
| 2014/0289821 A1 | 9/2014 | Wilson | |
| 2014/0310764 A1* | 10/2014 | Tippett | G06F 21/31 |
| | | | 726/1 |
| 2014/0315159 A1* | 10/2014 | Mukherjee | G06Q 10/103 |
| | | | 434/107 |
| 2015/0032621 A1 | 1/2015 | Kar et al. | |
| 2015/0120572 A1 | 4/2015 | Slade | |
| 2015/0213474 A1 | 7/2015 | Howe | |

OTHER PUBLICATIONS

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

QThru.com. "QThru: use your mobile smartphone for self-checkout." http://www.qthru.com/. QThru.com © 2011. 6 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/SB10001424052748703421204576329253050637400.html. 5 pages. Retrieved Mar. 22, 2013.

Office Action dated Aug. 27, 2015 for U.S. Appl. No. 14/175,701.

* cited by examiner

PROVIDING AUTHENTICATION USING PREVIOUSLY-VALIDATED AUTHENTICATION CREDENTIALS

CROSS-REFERENCE OF RELATED APPLICATIONS

This application is a continuation of U.S. patent application Ser. No. 14/175,146, filed Feb. 7, 2014, which is hereby incorporated by reference in its entirety.

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity prior to transferring any personal information using an electronic means.

The security of personal information transferred over the Internet is pertinent as customers often conduct their business using applications executed on their mobile devices. However, for some people, individually authenticating and/or verifying their identity for individual applications every time they need to complete small tasks (e.g., checking an available account balance) can become quite burdensome.

Therefore, a need exists for a means to reduce a customer's burden when authenticating multiple applications.

BRIEF SUMMARY

Embodiments of the invention are directed to systems, methods, and computer program products for providing authentication using previously-validated authentication credentials. An exemplary apparatus for providing authentication using previously-validated authentication credentials may comprise a memory, a processor, and a module stored in the memory, executable by the processor, and configured to receive a request, from a user, to access a framework application, where access to the framework application requires a primary level of user authentication, request, from the user, one or more authentication credentials corresponding to the primary level of user authentication, receive the one or more authentication credentials from the user, validate the one or more authentication credentials, thereby resulting in a validation of the primary level of user authentication, create, using the framework application, an authentication token based at least partially on the validation of the primary level of user authentication, where the authentication token is accessible by a plurality of applications, receive a request, from the user, to access one or more non-framework applications, and authenticate the one or more non-framework applications, where authenticating the non-framework applications requires accessing the authentication token created by the framework application such that the authentication is at least partially based on the primary level of user authentication.

In some embodiments, the module may be further configured to deny the request to authenticate the one or more non-framework applications in response to in response to determining the validation of the primary level of user authentication has expired, and prompt the user to authenticate the framework application using the primary level of authentication prior to requesting to authenticate the one or more non-framework applications.

In some embodiments, the module may be further configured to deny the request to authenticate the one or more non-framework applications in response to determining the validation of the primary level of user authentication has expired, and prompt the user to authenticate the one or more non-framework applications using the primary level of authentication.

In some embodiments, the module may be further configured to determine a degree of confidence for authenticating the one or more non-framework applications based at least partially on a degree of confidence of the primary level of authentication.

In some embodiments, authentication of the framework application decreases the degree of confidence required for authenticating the one or more non-framework applications from a first degree of confidence to a second degree of confidence, and where the first degree of confidence is stronger than the second degree of confidence.

In some embodiments, the module being further configured to receive from the user one more user preferences for determining the degree of confidence required for authenticating of each of the one or more non-framework applications.

In some embodiments, the primary level of authentication comprises a multiple factor authentication, and where authenticating the one or more non-framework applications comprises a single factor authentication.

In some embodiments, the primary level of authentication comprises a hard or soft authentication, and where authenticating the one or more non-framework applications comprises a soft authentication or zero authentication.

In some embodiments, the one or more authentication credentials comprise at least one of a user name, a password, a web-based security system, a personal identification number (PIN), a security question, or a biometric screening parameter.

An exemplary method may comprise one or more steps for providing authentication using previously-validated authentication credentials including, but not limited to, receiving a request, from a user, to access a framework application, where access to the framework application requires a primary level of user authentication, requesting, from the user, one or more authentication credentials corresponding to the primary level of user authentication, receiving the one or more authentication credentials from the user, validating the one or more authentication credentials, thereby resulting in a validation of the primary level of user authentication, creating, using the framework application, an authentication token based at least partially on the validation of the primary level of user authentication, where the authentication token is accessible by a plurality of applications, receiving a request, from the user, to access one or more non-framework applications, and authenticating the one or more non-framework applications, where authenticating the non-framework applications requires accessing the authentication token created by the framework application such that the authentication is at least partially based on the primary level of user authentication.

In some embodiments, the method may further comprise denying the request to authenticate the one or more non-framework applications in response to determining the validation of the primary level of user authentication has expired, and prompting the user to authenticate the framework application using the primary level of authentication prior to requesting to authenticate the one or more non-framework applications.

In some embodiments, the method may further comprise denying the request to authenticate the one or more non-framework applications in response to determining the framework application is unauthenticated based on a failure to validate the one or more authentication credentials, and prompting the user to authenticate the one or more non-framework applications using the primary level of authentication.

In some embodiments, the method may further comprise determining a degree of confidence for authenticating the one or more non-framework applications based at least partially on a degree of confidence of the primary level of authentication.

In some embodiments, authentication of the framework application decreases the degree of confidence required for authenticating the one or more non-framework applications from a first degree of confidence to a second degree of confidence, and where the first degree of confidence is stronger than the second degree of confidence.

In some embodiments, the method may further comprise receiving from the user one more user preferences for determining the degree of confidence required for authenticating of each of the one or more non-framework applications.

An exemplary computer program product for providing authentication using previously-validated authentication credentials, the computer program product may comprise a non-transitory computer-readable medium comprising a set of codes for causing a computer to receive a request, from a user, to access a framework application, where access to the framework application requires a primary level of user authentication, request, from the user, one or more authentication credentials corresponding to the primary level of user authentication, receive the one or more authentication credentials from the user, validate the one or more authentication credentials, thereby resulting in a validation of the primary level of user authentication, create, using the framework application, an authentication token based at least partially on the validation of the primary level of user authentication, where the authentication token is accessible by a plurality of applications, receive a request, from the user, to access one or more non-framework applications, and authenticate the one or more non-framework applications, where authenticating the non-framework applications requires accessing the authentication token created by the framework application such that the authentication is at least partially based on the primary level of user authentication.

In some embodiments, the computer program product further comprises a set of codes for causing a computer to deny the request to authenticate the one or more non-framework applications in response to determining the validation of the primary level of user authentication has expired, and prompt the user to authenticate the framework application using the primary level of authentication prior to requesting to authenticate the one or more non-framework applications.

In some embodiments, the computer program product further comprises a set of codes for causing a computer to deny the request to authenticate the one or more non-framework applications in response to in response to determining the validation of the primary level of user authentication has expired, and prompt the user to authenticate the one or more non-framework applications using the primary level of authentication.

In some embodiments, the computer program product further comprises a set of codes for causing a computer to determine a degree of confidence for authenticating the one or more non-framework applications based at least partially on a degree of confidence of the primary level of authentication.

In some embodiments, authentication of the framework application decreases the degree of confidence required for authenticating the one or more non-framework applications from a first degree of confidence to a second degree of confidence, and where the first degree of confidence is stronger than the second degree of confidence.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "over-arching" and/or framework application, and/or the like may be used as types of identity authentication.

The different types of authentication may provide differing degrees of confidence regarding the authentication using such types. For example, if a username by itself is used for a first and/or primary user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Figure 1A:
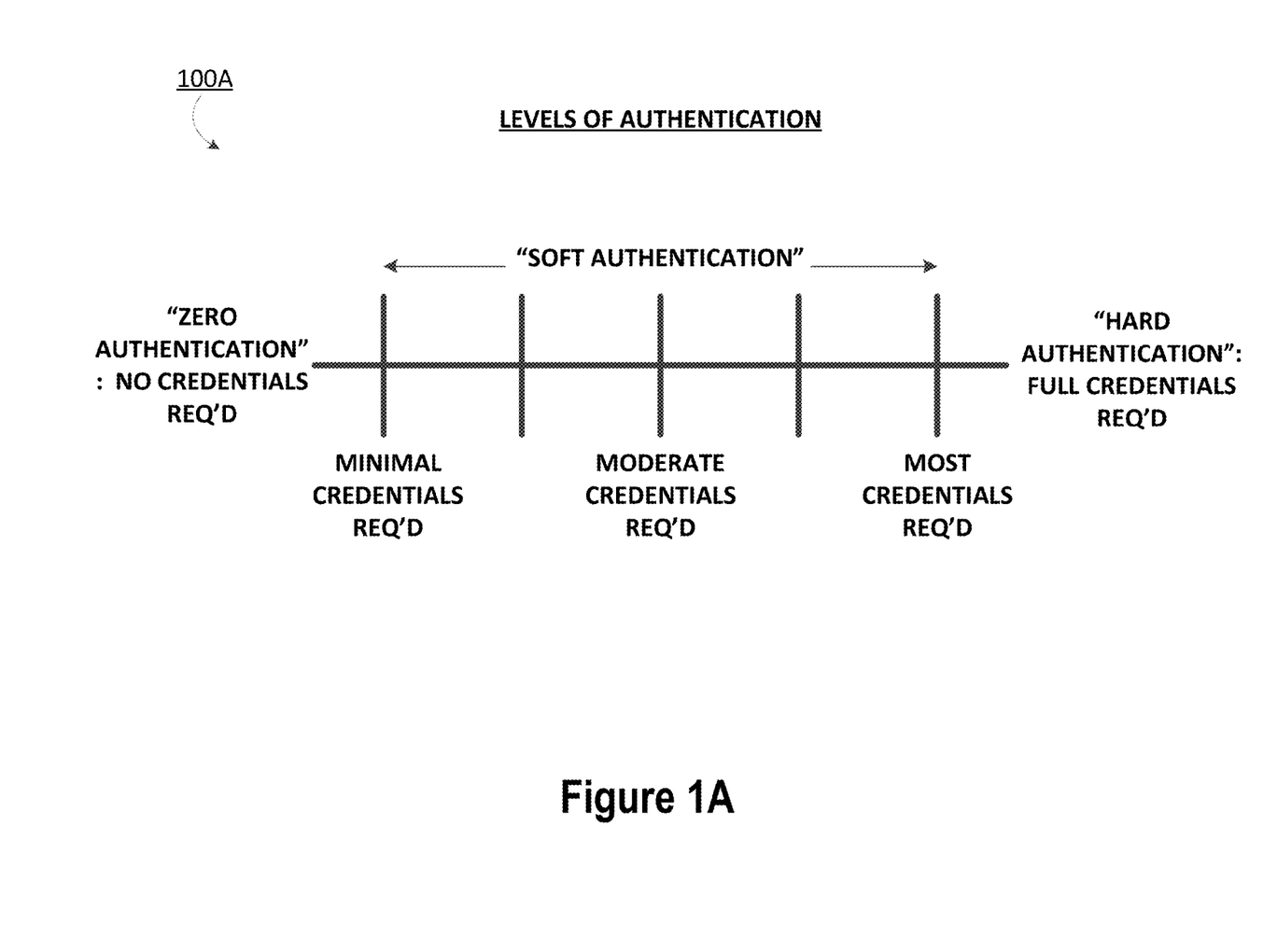
FIG. 1A provides a diagram illustrating an authentication continuum, in accordance with an embodiment of the present invention.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Figure 1B:
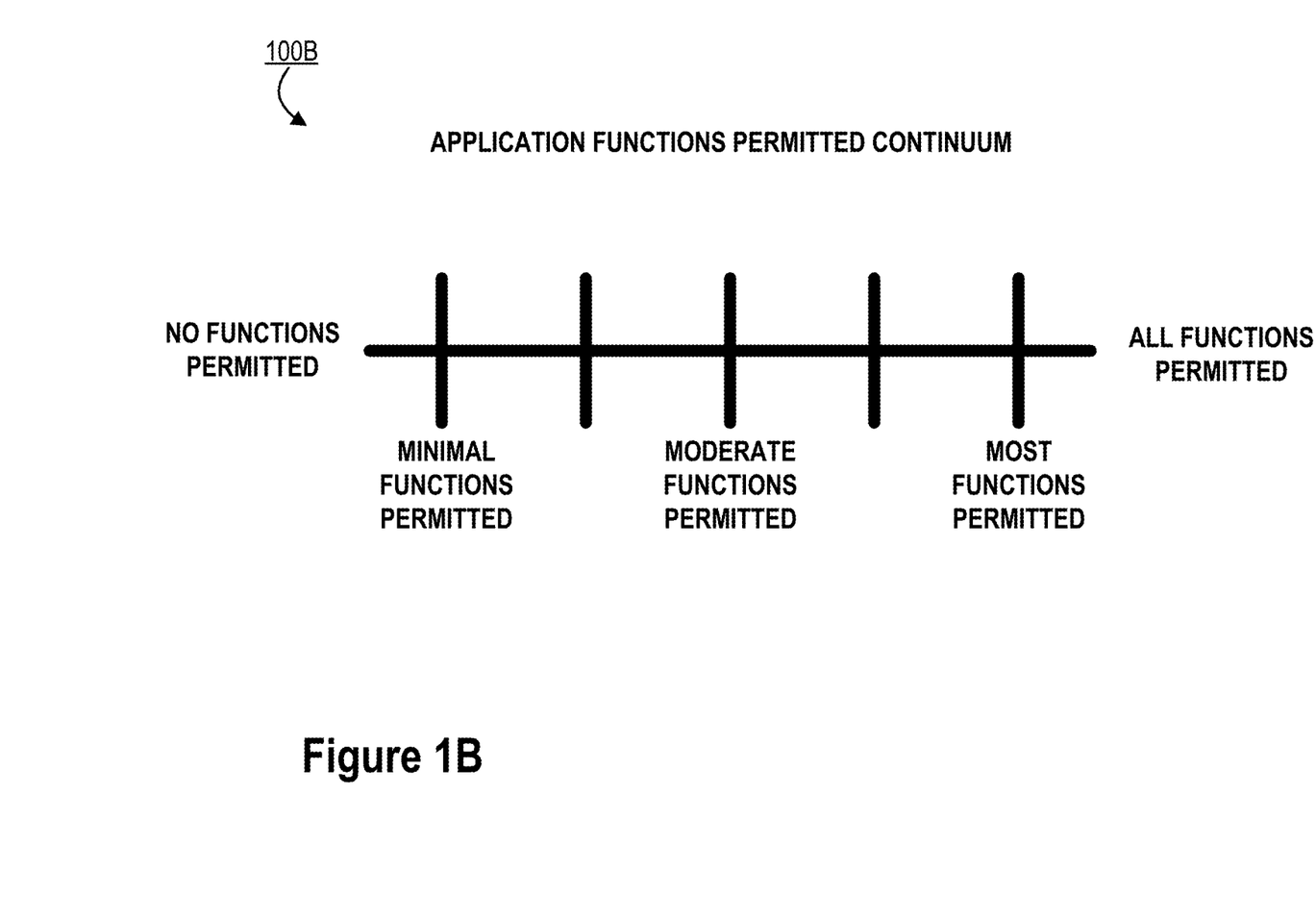
FIG. 1B provides a diagram illustrating an application functions permitted continuum, in accordance with an embodiment of the present invention.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Figure 1C:
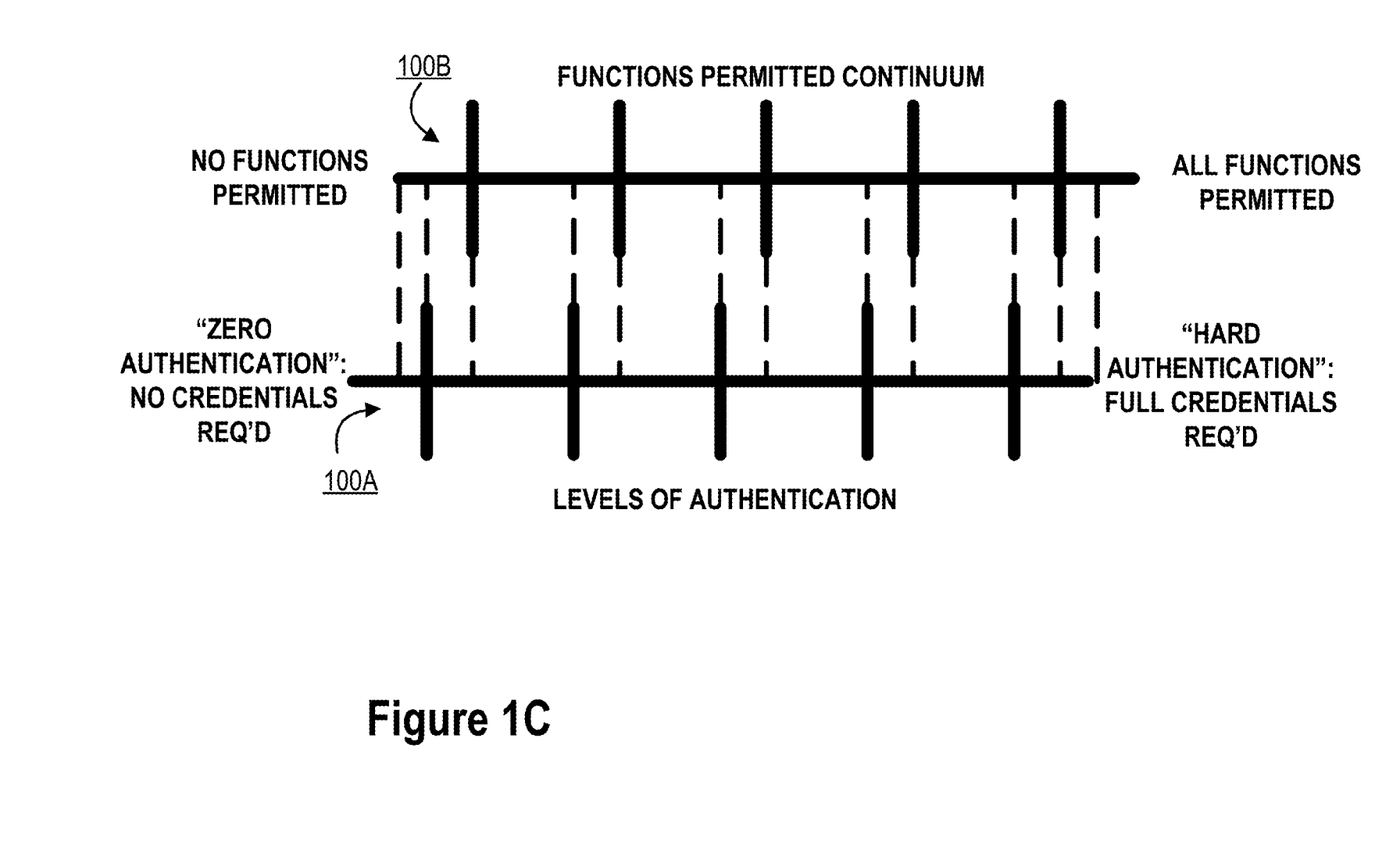
FIG. 1C provides a diagram illustrating multiple continuums, in accordance with an embodiment of the present invention.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continuum 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Figure 2:
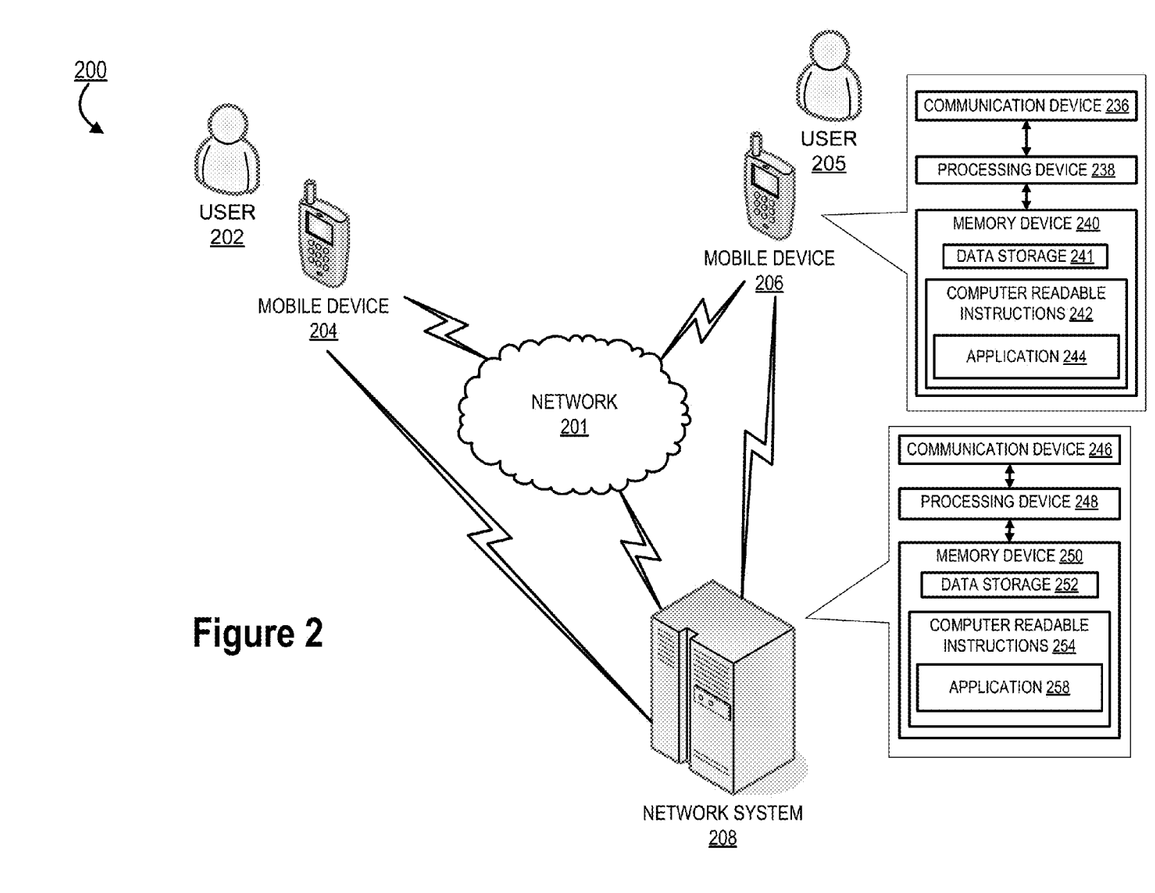
FIG. 2 provides a diagram illustrating a network environment for providing authentication using previously-validated authentication credentials, in accordance with an embodiment of the present invention.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

It is understood that the servers, systems, and devices described herein illustrate one embodiment of the invention. It is further understood that one or more of the servers, systems, and devices can be combined in other embodiments and still function in the same or similar way as the embodiments described herein.

Figure 3:
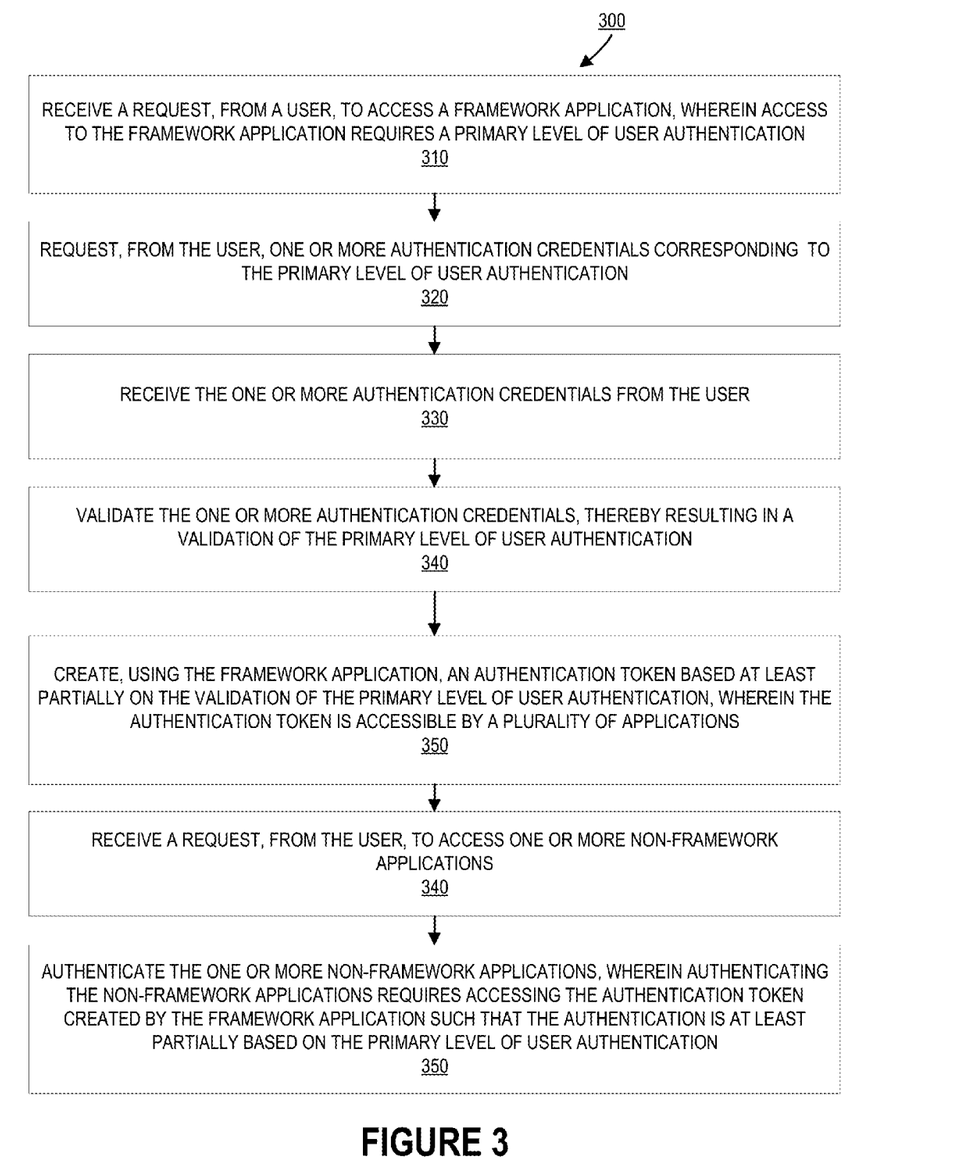
FIG. 3 provides a flow diagram illustrating a method for providing authentication using previously-validated authentication credentials, in accordance with embodiments of the invention.

Referring now to FIG. 3, a high level process flow for providing authentication using previously-validated authentication credentials 300 is illustrated in accordance with one embodiment of the present invention, which will be discussed in further detail throughout this specification. As illustrated, the method may comprise a plurality of steps, including but not limited to, receiving a request from a user to access a framework application 310, requesting that the user provide authentication credentials for a primary level of user authentication 320, receiving the authentication credentials 340, subsequently validating the authentication credentials 360, creating an authentication token that is accessible by a plurality of applications 370, receiving a request to access a non-framework application 380, and authenticating the non-framework application by accessing the authentication token such that the authentication of the non-framework application is at least partially dependent on the primary level of user authentication 390.

As used herein, a "framework application" may be or include any application that is executable on the user's computing system and/or mobile device and designed/built using a specific application framework. The application framework may be an integrated platform for developing and deploying software applications. In embodiments of the present invention, a specific application framework is provided by a particular entity such as a financial institution, a business associated with the user, a third-party software provider, and/or a combination of the aforementioned entities. To this extent, as discussed herein, any applications designed using the specified application framework may be referred to as framework applications, and any applications designed independent of the application framework may be referred to as non-framework applications. It should be noted an application built using a framework that has not been specified by the particular entity may still be referred to as a non-framework application. In an alternate embodiment, for the purpose of user authentication, the framework application may be an application that is designated by the user as a framework application. To this extent, any application not designated by the user as a framework application may be referred to as a non-framework application. For example, the user may designate an application that is associated as with sensitive user information as the framework application. This may be typically done because authentication of the framework application is more stringent than the authentication of a general application such as a social networking application. In some embodiments, a single user device may have only one framework application. However, in other embodiment, multiple framework applications may exist either because the multiple applications have been built using the application framework or the user has designated the multiple applications as framework applications. In this regard, in some embodiments, an application not built using the application framework may still be designated as a framework application based on the users preferences.

As represented by step 310, the system first receives a request, from a user, to access a framework application. In some embodiments, the system receives a request to access the framework application in response to the user making an attempt to launch the application on their computing device. The user may provide a request to access the framework application via the graphical user interface (GUI) of their computing device. For example, the user may select an icon that is displayed on the GUI of their mobile device and associated with a particular framework application. In response to the user selecting the icon, a request may be sent on behalf of the user to the system indicating that the user is making an attempt to access the framework application. In one embodiment, the user may provide a request to access the framework application via a command prompt associated with their computing device. For example, the user may open a command prompt associated with their computing device and provide one or more commands for executing a framework application. In response to the user providing a command to execute the framework application, a request may be sent on behalf of the user to the system indicating that the user is making an attempt to access the framework application. In another embodiment, the user may provide a request to access the framework application via a voice command to their computing device. For example, the user may provide a verbal command to their mobile device requesting that the application be launched on the mobile device. In response to the user providing a verbal command to launch the framework application, a request may be sent on behalf of the user to the system indicating that the user is making an attempt to access the framework application. In yet another embodiment, the user may provide a request to access the framework application in response to scanning visual indicia (e.g. barcode, Quick Response (QR) code, hologram, and the like) associated with the framework application. For example, the user may scan, using their mobile device, a barcode that is associated with the framework application. In response to the user scanning the barcode, a request may be sent on behalf of the user to the system indicating that the user is making an attempt to access the framework application.

To the extent that any person with possession of the user's computing device is capable of requesting opening an application on the computing device, in some instances the user's identity must be verified prior to the system granting access to applications that are associated with sensitive user information and/or data. Thus, access to the framework application may require a primary level of user authentication. As used herein, the "primary level of user authentication" may refer to an initial validation of the user's identity prior to granting the user general access to the application. However, in some embodiments the primary level of user authentication may be required prior to granting the user access to any of the application functions. Depending on the level of functionality to which the user wants to be granted access within any particular application, one or more additional levels of user authentication may be required subsequent to the primary level of user authentication. As used herein, the one or more additional levels of user authentication may be referred to as a "secondary level of user authentication". In an exemplary embodiment, the primary level of user authentication requires a stricter level of authentication in respect to any subsequent authentications of the user that may be required by either the framework and/or a non-framework application. Either or both the primary and/or secondary authentications may be either multi-factor or single factor authentications, where the number of authentications credentials required may vary. In some embodiments, the secondary authentication may require zero (0) authentication credentials, where authentication credentials may include, but not be limited to, at least one of a user name, a password, a personal identification number (PIN), a security question, a biometric screening parameter, a web-based security system that provides one type of mutual authentication between end-users and websites, or the like.

As represented by step 320, after receiving the request, from the user, to access the framework application, the system may then send the user a request to provide one or more authentication credentials that correspond with the user identity validation required for the primary level of user authentication. The type of authentication credentials that the system may request from the user are at least partially dependent on the degree of confidence associated with the primary level of user authentication where either the user, the providing entity associated with the framework application, or a third-party entity and/or software provider may determine the degree of confidence required for accessing the framework application.

Requesting, from the user, one or more authentication credentials corresponding to the primary level of authentication may comprise presenting, on a GUI associated with the user's computing device, a request form where the request form indicates the authentication credentials the user is required to provide in order to verify their identity. The request form may additionally verify that the information which the user enters into the request form is valid according to predetermined rules for the authentication credentials. For example, if an authentication credential required for the primary level of user authentication is a password, a predetermined rules may specify that the password be a specific length such that if the amount of characters that the user enters into the password field is less the length required for the password the request form may display an error message indicating the password is "too short", allowing the user to correct their mistake prior to submitting the provided authentication credentials for validation.

In some embodiments, the user has an account associated with the framework application. As such, the account may have access to a variety of user information, including but not limited to, the user's name, address, telephone number, email address and the like. In such an embodiment, the system may automatically acquire at least a portion of the user credentials for use in validating the primary level of user authentication. For example, if an authentication credential required for the primary level of user authentication is a user email address and the user provided their email address during an account setup associated with the framework application, the system may automatically acquire the email address from the framework application and insert the email address into the request form prior to presenting the request form to the user via a display associated with their computing device.

In some embodiments, the user may be required to have an account associated with the framework application prior to accessing the framework application. In such an embodiment, in response to receiving a request from the user to access the framework application, the system may first determine whether or not the user has setup an account with the framework application. Determining whether or not the user has an account associated with the framework application may require querying the user and/or requesting that the user either provide account login credentials or proceed with a plurality of steps for setting up an account to be associated with the framework application. If it is determined that the user does not have an account associated with the framework application and/or the user selects an option to setup an account the system may present, on a GUI associated with the user's computing device, an account setup form where the user may provide information for creating an account to be associated with the framework application. In some embodiments, the account setup and request for one or more authentication credentials may occur simultaneously. In another embodiment, the system first creates a user account to be associated with the framework application and subsequently request the one or more authentication credentials corresponding to the primary level of user authentication.

In some embodiments, where the user has an account associated with the framework application the initial primary level of user authentication may be a hard authentication, and subsequent request to access the framework application may require less authentication credentials as the system may obtain at least a portion of the authentication credentials from the user account information associated with the framework application. For example, access to the framework application may require a primary level of user authentication that includes the user providing a user name and password. If the user is not presenting a first-time request to access the framework application and the user has previously provided a user name during the account setup process, the system may automatically obtain the user name from the framework application and the user may be merely required to provide the password in order to obtain access to the framework application. In some embodiments the system may obtain information related to the user credentials that is locally stored on the user's mobile device, and in alternate embodiments, the information may be remotely stored in a secure location and the system may obtain the information by contacting a remote server associated with the framework application.

As represented by step 340, after requesting the one or more authentication credentials corresponding to the primary level of user authentication, the system then receives the one or more authentication credentials from the user. In some embodiments, receiving the one or more authentication credentials further comprises verifying that the authentication credentials are valid according to predetermined rules for the authentication credentials. For example, if an authentication credential required for the primary level of user authentication is a credit and/or debit card number associated a user's account, the system may first verify that the user has entered a valid card number. If it is determined that the user entered an invalid parameter (card number, expiration date, card validation code, or the like), the system may display an error message informing the user that the received credential was invalid and request that the user provide a valid authentication credential for the primary level of user authentication.

In some embodiments, the one or more authentication credentials are received and stored locally on the user's computing device. The authentication credentials may be stored locally on the computing device for use by the framework application or other non-framework applications that are executable on the user's computing device. In such an embodiment, the authentication credentials may be encrypted prior to being stored on the user's computing device. The encrypted authentication credentials may be accessible by only the framework application itself or by a plurality of non-framework applications. To this extent, the system may additionally create a decryption key for later accessing the authentication credentials and provide one or more applications including the framework application with the decryption key.

In some embodiments, the one or more authentication credentials may be received and stored remotely on a server associated with the framework application. The authentication credentials may be stored remotely on a server associated with the framework application for use by the framework application or other non-framework applications that are executable on the user's computing device. In such an embodiment, the authentication credentials may be encrypted prior to being transferred to the remote server. The system may also store, locally on the user's computing device, a pointer referring the remote location of the authentication credentials such that the framework application and other non-framework applications may later access the authentication credential via the pointer.

As represented by step 350, after receiving the one or more authentication credentials, the system may validate the one or more authentication credentials such that it results in a validation of the primary level of user authentication. In some embodiments, validating the authentication credentials comprises comparing the received authentication credentials to information that is stored in a database and maintained by an entity associated with the framework application or a third-party. If the system determines that the received authentication credentials are accurate with reference to the stored information then the system may validate the primary level of user authentication. Validating the primary level of user authentication additionally comprises granting the user access to the framework application such that the user is allowed to execute a plurality of functions within the framework application.

As represented by step 360, after a validation of the primary level of user authentication, the system may create, using the framework application, an authentication token that is based at least partially on the primary level of user authentication. To this extent the authentication token may include additional information that was not explicitly provided during the primary level of user authentication but is inherently known by the framework application. As used herein, the authentication token may refer to a series of pointers that reference the location of the authentication credentials such that referencing the authentication token further provides the authentication credentials to the appropriate application.

In some embodiments, the system may create a plurality of authentication tokens where each authentication token corresponds to a different degree of confidence regarding the authentication associated with the authentication token. To this extent, the authentication token may be created using either a portion of the received authentication credentials or all of the received authentication credentials. For example, a "zero authentication" token may only reference the user's first and last name, email address, mobile phone identification number, media access control (MAC) address, and/or another non-private credential, a "a soft authentication" token may reference the user's user name and password, and a "hard authentication" token may reference the prior mentioned authentication credentials in addition to a plurality of security questions and answers.

The authentication token may be optionally accessible by a plurality of applications that are executable on the user's computing device. In some embodiments, the system is further configured to associate one or more non-framework applications with the framework application such that the non-framework actions are granted access to the authentication token for use in providing secondary levels of user authentication. In some embodiments, any non-framework applications that have not been associated with the framework application may be denied access to the authentication token. The authentication token may also be accessible by other framework applications such that their authentication is at least partially based on the originally authenticated framework application.

In some embodiments, the authentication token has an expiration period (e.g. day, month, time, and the like) that is assigned when the authentication token is initially created. Expiration of the authentication token may subsequently result in the expiration of the validation of the primary level of user authentication. In an instance that the authentication token expires the system may be configured to reactivate the authentication token using either an equivalent or lesser degree of the level of authentication used when originally creating the authentication token, or the system may be configured to create a new authentication token by prompting the user to provide authentication credentials that correspond to the primary level of user authentication and revalidating the received authentication credentials.

In some embodiments, non-framework applications may be associated with a different authentication token based on the various factors, including but not limited to, the application type, the user's preferences, predetermined rules provided by a financial institution or third-party entity, and/or the like. For example, applications that contain sensitive user information may be associated with a soft authentication token requiring them to still provide answers to the one or more security questions required for a hard authentication.

In some embodiments, the user may specify and/or provide user preferences that specify which applications should be associated with the framework application. In such an embodiment, the system may present, on a GUI associated with the user's computing device, an option for the user to select one or more non-framework applications to be associated with the framework application. In some embodiments, after receiving the user's selection of non-framework applications to associate with the framework application the system may write the non-framework applications access rights to the authentication token. To this extent, the system may verify that an application has access rights to the authentication token prior to providing the applications with the associated authentication credentials. The user may additionally specify the degree of confidence of the authentication token to be associated with each non-framework application.

As represented by step 370, the system may additionally receive a request, from a user, to access to a non-framework application. In some embodiments, the system receives a request to access the non-framework application in response to the user making an attempt to launch the application on their computing device. The user may provide a request to access the non-framework application via the graphical user interface (GUI) of their computing device. For example, the user may select an icon that is displayed on the GUI of their mobile device and associated with a particular non-framework application. In response to the user selecting the icon, a request may be sent on behalf of the user to the system indicating that the user is making an attempt to access the non-framework application. In one embodiment, the user may provide a request to access the non-framework application via a command prompt associated with their computing device. For example, the user may open a command prompt associated with their computing device and provide one or more commands for executing a non-framework application. In response to the user providing a command to execute the non-framework application, a request may be sent on behalf of the user to the system indicating that the user is making an attempt to access the non-framework application. In another embodiment, the user may provide a request to access the non-framework application via a voice command to their computing device. For example, the user may provide a verbal command to their mobile device requesting that the application be launched on the mobile device. In response to the user providing a verbal command to launch the non-framework application, a request may be sent on behalf of the user to the system indicating that the user is making an attempt to access the non-framework application. In yet another embodiment, the user may provide a request to access the non-framework application in response to scanning visual indicia (e.g. barcode, Quick Response (QR) code, hologram, and the like) associated with the non-framework application. For example, the user may scan, using their mobile device, a barcode that is associated with the non-framework application. In response to the user scanning the barcode, a request may be sent on behalf of the user to the system indicating that the user is making an attempt to access the non-framework application.

In some instances the user's identity must be verified prior to the system granting access to applications that are associated with sensitive user information and/or data. Thus, access to a non-framework application that has been associated with the framework application may still require a secondary level of user authentication to increase the degree of confidence associated with the level of user authentication.

As represented by step 380, after receiving the request, from the user, to access the one or more non-framework applications, the system may authenticate the non-framework applications based at least partially in response to accessing the authentication token created by the framework application such that the authentication of the non-framework applications are at least partially dependent on the primary level of user authentication. The secondary level of user authentication associated with the non-framework applications may vary in degree of confidence. However, it should be noted, that any secondary level of user authentication that is greater than zero authentication may increase the overall degree of confidence in verifying and/or authenticating the user's identity.

Figure 4:
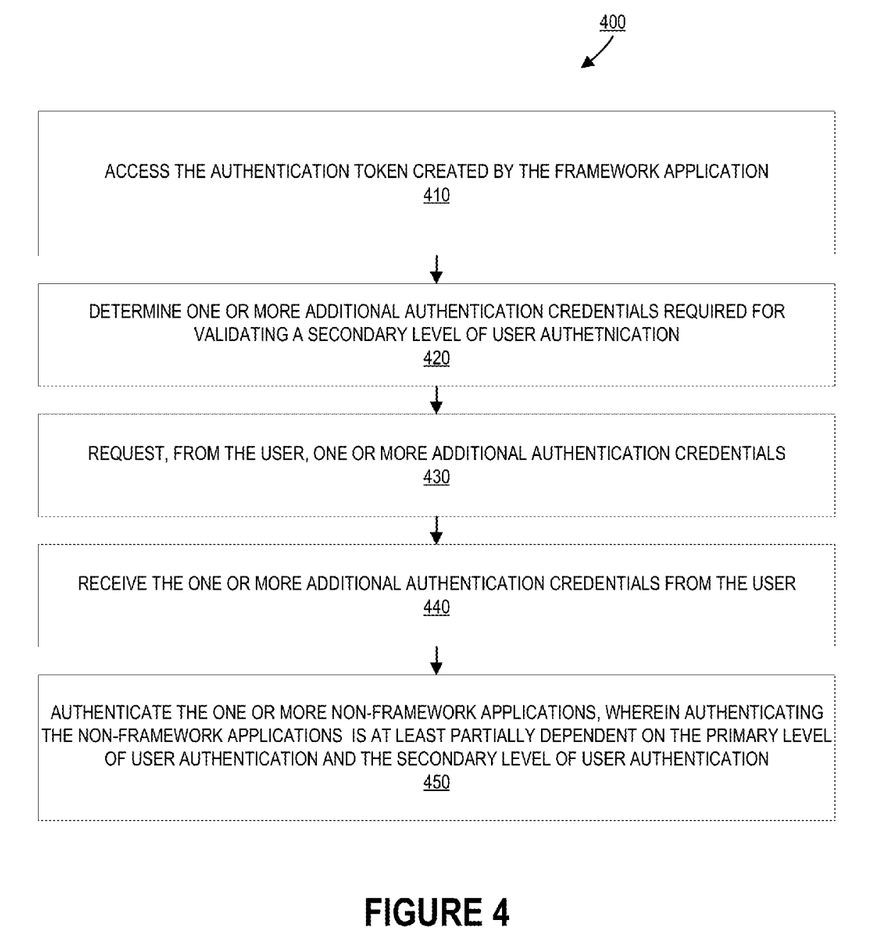
FIG. 4 provides a flow diagram illustrating a method for authenticating non-framework applications, in accordance with embodiments of the invention.

Referring now to FIG. 4, a high level process flow for authenticating a non-framework application 400 is illustrated in accordance with one embodiment of the present invention. The non-framework applications may be authenticated and granted access similarly to the framework application. As illustrated in FIG. 4, authenticating the one or more non-framework applications may include a plurality of steps including, but not limited to, accessing the authentication token created by the framework application 410 where accessing the authentication token further comprises receiving and/or requesting to receive the authentication credentials previously received from the user and validated. The system may then determine one or more additional authentication credentials required, if any, for a secondary level of user authentication 420. For example, if the primary level of user authentication was a hard authentication then the user may only be required to verify and re-enter at least one of the previously provided authentication credentials in order to validate the secondary level of user authentication. The system may then request from the user, one or more additional authentication credentials 430. In some embodiments, at least one credential is not included in the authentication credentials corresponding to the primary level of user authentication. For example, the authentication credentials may include a user name, password, and security question and the additional authentication credentials may include only a four digit pen. Alternatively, in some embodiments, the one or more additional authentication credentials may be credentials that were previously provided during the validation of the primary level of user authentication, and are requested again for security purposes. For example, the authentication credentials may include a user name, password, and security question and the additional authentication credentials may include only the password. After receiving the request, the system may then access the authentication. After receiving the one or more additional authentication credentials from the user 440, the system may authenticate the one or more non-framework applications such that the authentication is based at least partially on the primary and secondary levels of user authentication 450.

In some embodiments, accessing the authentication token first requires the system to verify that the non-framework application has been associated with the framework application, and in other embodiments, the non-framework application may access the authentication token without being first associated with the framework application. The system may then write and/or transfer the authentication credentials associated with the referenced authentication token to the non-framework application for use in processing the secondary level of authentication. In some embodiments, prior to writing and/or transferring authentication credentials to a non-framework application the system may first determine the type of token (e.g zero, soft, hard) that should be accessed.

In some embodiments, the system may determine the degree of confidence required for the secondary level of user authentication based at least partially on the degree of confidence or the token or the degree of confidence of the primary level of user authentication. For example, if a hard authentication was required for the primary level of user authentication the system may determine that a soft authentication is required for the secondary level of user authentication. Likewise, if a soft authentication was required for the primary level of user authentication the system may determine that zero authentication is required for the secondary level of user authentication. For example, a non-framework application may be a social networking application, whereas the framework application may be a financial application that grants the user access to their financial information, thus authentication of the financial application is more stringent than the authentication of the social networking application. To this extent, in some embodiment, the degree of confidence associated with the authentication of the framework application may decrease the degree of confidence required for the non-framework application. The secondary level of user authentication may require the system requesting and receiving one or more additionally authentication credentials that were not previously provided during the primary level of user authentication. Also, in some embodiments, the types of authentication credentials required during the secondary level of authentication may vary based on the level of functionality or the type of information the user is requesting to access within the non-framework application.

In some embodiments, a user may explicitly specify via user preferences the degree of confidence that should be associated with either the framework or one or more non-framework applications. In an exemplary embodiment, the user may specify these preferences either from within a widget associated with the framework application or via a web portal associated with an entity that maintains the application. For example, in one embodiment, the user may login to an online web portal and specify the degree of confidence required for authenticating the framework application on the user's mobile device, the user may then authenticate the framework application and associate one or more non-framework applications such that the user can further specify, from within the framework application, the degree of confidence required for authenticating the one or more associated non-framework applications. In some embodiments, the authentication of any application may be initially associated with a certain degree of confidence that was specified as a default from the developer or entity providing the application, in such an embodiment, the user preferences for defining the degree of confidence associated with each application may override this default parameter. Thus the system may be configured to execute one or more steps including, but not limited to, receiving from a user, one or more user preferences specifying the degree of confidence to be used when authenticating an application, determine the specified degree of confidence is different from the default degree of confidence, and overriding the default degree of confidence required such that the specified degree of confidence is what the system requires when authenticating the application. To this extent, the user may either increase or decrease the degree of confidence used for authenticating the application. In an instance that the user decreases the degree of confidence the system may be configured to present, on a display, to the user a warning message outlining potential repercussions associated with lessening the degree of confidence for authentication of the application.

After receiving the one or more authentication credentials required for the secondary level of user authentication, the system may validate the one or more additional authentication credentials such that it results in a validation of the secondary level of user authentication. In some embodiments, validating the authentication credentials comprises comparing the received authentication credentials to information that is stored in a database and maintained by an entity associated with the framework application or a third-party. If the system determines that the received authentication credentials are accurate with reference to the stored information then the system may validate the secondary level of user authentication. Validating the secondary level of user authentication additionally comprises granting the user access to the non-framework application such that the user is allowed to execute a plurality of functions within the non-framework application.

In some embodiments, receiving a request, from the user to access one or more non-framework applications further comprises determining whether or not the user has previously validated authentication credentials and/or whether or not the user has previously validated the primary level of user authentication. If it is determined that the user has failed to validates the one or more authentication credentials resulting in a validation of the primary level of user authentication the system may then deny the request to authenticate the one or more non-framework applications, in response to determining the non-framework application has not been authenticated, and prompt the user to authenticate the framework application using the primary level of user authentication prior to submitting any request to authenticate one or more non-framework applications. In such an embodiment, the authentication of a non-framework application may exclusively depend on the authentication of the framework application such that the non-framework application cannot be authenticated on its.

In other embodiments, the authentication of a non-framework application may not exclusively depend on the authentication of the framework application such that the non-framework application can be authenticated without depending on the primary level of user authentication. Thus, in some embodiments, the non-framework application may be authenticated independent of the framework application or the primary level of authentication may be directly authenticated on behalf of the non-framework application in an instance that it is absent and/or has not been validated on behalf of the framework application. In some embodiments, receiving a request from the user to access one or more non-framework applications further comprises determining whether or not the user has previously validated authentication credentials and/or whether or not the user has previously validated the primary level of user authentication. If it is determined that the user has failed to validates the one or more authentication credentials resulting in a validation of the primary level of user authentication the system may then deny the request to authenticate the one or more non-framework applications, in response to determining the non-framework application has not been authenticated, and prompt the user to authenticate the non-framework application using the primary level of user authentication.

Various factors may contribute to a failure to validate the one or more authentication credentials that result in a validation of the primary level of user authentication. In one embodiment, the validation of the primary level of user authentication is temporary such that it is associated with an expiration date or period (e.g. minutes, hours, days, weeks, or the like). After the designated expiration period has passed the framework application may revert to an unauthenticated state which results in a failure to validate the one or more authentication credentials and/or the primary level of user authentication.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. patent application Ser. No. | Title | Filed On |
|---|---|---|---|
| 6015US1.014033.2098 | 14/175,639 | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 6015US2.014033.2099 | 14/175,643 | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 |
| 6015US3.014033.2100 | 14/175,646 | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 |
| 6016US1.014033.2101 | 14/175,701 | USER AUTHENTICATION BASED ON HISTORICAL TRANSACTION DATA | Feb. 7, 2014 |
| 6017US1.014033.2102 | 14/175,947 | USER AUTHENTICATION BASED ON HISTORICAL USER BEHAVIOR | Feb. 7, 2014 |
| 6018US1.014033.2103 | 14/175,954 | USER AUTHENTICATION BY GEO-LOCATION AND PROXIMITY TO USER'S CLOSE NETWORK | Feb. 7, 2014 |
| 6019US1.014033.2106 | 14/175,863 | USER AUTHENTICATION BASED ON OTHER APPLICATIONS | Feb. 7, 2014 |
| 6020US1.014033.2107 | 14/175,863 | USER AUTHENTICATION BASED ON FOB/INDICIA SCAN | Feb. 7, 2014 |
| 6021US1.014033.2108 | 14/175,688 | USER AUTHENTICATION BASED ON SELF-SELECTED PREFERENCES | Feb. 7, 2014 |
| 6022US1.014033.2109 | 14/175,136 | SHUTTING DOWN ACCESS TO ALL USER ACCOUNTS | Feb. 7, 2014 |
| 6034US1.014033.2115 | 14/175,771 | REMOTE REVOCATION OF APPLICATION ACCESS BASED ON LOST OR MISAPPROPRIATED CARD | Feb. 7, 2014 |
| 6034US2.014033.2116 | 14/175,786 | REVOCATION OF APPLICATION ACCESS BASED ON NON-CO-LOCATED | Feb. 7, 2014 |
| 6021US2.014033.2155 | 14/175,672 | SELF-SELECTED USER ACCESS BASED ON SPECIFIC AUTHENTICATION TYPES | Feb. 7, 2014 |
| 6024US1.014033.2111 | 14/175,652 | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 6025US1.014033.2126 | 14/175,956 | SORTING MOBILE BANKING FUNCTIONS INTO AUTHENTICATION BUCKETS | Feb. 7, 2014 |
| 6025US2.014033.2127 | 14/175,962 | AUTHENTICATION LEVEL OF FUNCTION BUCKET BASED ON CIRCUMSTANCES | Feb. 7, 2014 |

What is claimed is:

1. An apparatus for providing authentication using previously-validated authentication credentials, the apparatus comprising:

a memory;

one or more processors; and computer executable code stored in memory, wherein the computer executable code, executed by the one or more processors, is configured to cause the one or more processors to:

receive a request, from a user, to access a framework application, wherein access to the framework application requires a primary level of user authentication comprising one of a plurality of authentication types that is selectable by the user, wherein the plurality of authentication types comprises at least one of a hard authentication and a soft authentication, wherein the hard authentication is a multi-factor verification requiring the user present at least two authentication credentials, wherein the soft authentication is at least a single factor verification requiring the user to present at least one authentication credential;

receive a user selected authentication type of the primary level of user authentication, wherein the user selected authentication type is selected from at least one of the hard authentication and the soft authentication;

request, from the user, one or more authentication credentials corresponding to the user selected authentication type of the primary level of user authentication;

receive the one or more authentication credentials from the user;

validate the one or more authentication credentials, thereby resulting in a validation of the user selected authentication type of the primary level of user authentication create, using the framework application, an authentication token corresponding to the user selected authentication type based at least partially on the validation of the user selected authentication type of the primary level of user authentication, wherein the authentication token is accessible by at least one non-framework application;

receive a request to access the at least one non-framework application;

access the authentication token created by the framework application; and at least partially authenticate the at least one non-framework application using the authentication token such that the authentication of the at least one non-framework application is at least partially based on the user selected authentication type of the primary level of user authentication, wherein authentication of the user selected authentication type of the primary level of user authentication decreases a degree of confidence required for authenticating the at least one non-framework application from at least a first degree of confidence to a second degree of confidence, and wherein the first degree of confidence is stronger than the second degree of confidence.

2. The apparatus of claim 1, wherein the computer executable code further comprises instruction code that causes the one or more processors to deny a second request to at least partially authenticate the at least one non-framework application in response to determining the validation of the user selected authentication type of the primary level of user authentication has expired.

3. The apparatus of claim 2, wherein the computer executable code further comprises instruction code that causes the one or more processors to prompt the user to authenticate the framework application using the primary level of user authentication prior to requesting to authenticate the at least one non-framework application.

4. The apparatus of claim 1, wherein the computer executable code further comprises instruction code that causes the one or more processors to deny a second request to authenticate the at least one non-framework application in response to determining the validation of the primary level of user authentication has expired.

5. The apparatus of claim 4, wherein the computer executable code further comprises instruction code that causes the one or more processors to prompt the user to authenticate the at least one non-framework application using the primary level of user authentication.

6. The apparatus of claim 1, wherein the computer executable code further comprises instruction code that causes the one or more processors to determine the degree of confidence required for authenticating the at least one non-framework application based at least partially on the user selected authentication type of the primary level of user authentication.

7. The apparatus of claim 1, wherein authenticating the at least one non-framework application further requires validation of a secondary level of user authentication, and wherein the secondary level of user authentication comprises a single factor authentication.

8. The apparatus of claim 1, wherein authenticating the at least one non-framework application further requires validation of a secondary level of user authentication, and wherein the secondary level of user authentication comprises a soft authentication.

9. The apparatus of claim 1, wherein the one or more authentication credentials comprise at least one of a user name, a password, a web-based security system, a personal identification number (PIN), a security question, or a biometric screening parameter.

10. The apparatus of claim 1, wherein the computer executable code further comprises instruction code that causes the one or more processors to determine one or more authentication credentials corresponding to a secondary level of user authentication for authenticating the at least one non-framework application, wherein determining the one or more credentials is based on the user selected authentication type of the primary level of user authentication.

11. The apparatus of claim 10, wherein the computer executable code further comprises instruction code that causes the one or more processors to receive, from the user, a response for each of the one or more authentication credentials corresponding to the secondary level of user authentication.

12. The apparatus of claim 11, wherein the computer executable code further comprises instruction code that causes the one or more processors to validate the response for each of the one or more authentication credentials corresponding to the secondary level of user authentication, thus resulting in a validation of the secondary level of user authentication.

13. The apparatus of claim 12, wherein the computer executable code further comprises instruction code that causes the one or more processors to authenticate the at least one non-framework application based at least in part on validating the secondary level of user authentication, such that the authentication of the at least one non-framework application is based at least partially on the validation of the secondary level of user authentication and based at least in part on the validation of the user selected authentication type of the primary level of user authentication.

* * * * *